Oct. 23, 1928.  
W. J. WRIGHTON  
1,688,446  
GOGGLES  
Filed June 9, 1924

INVENTOR  
William J. Wrighton  
BY  
Harry H. Styll  
ATTORNEY

Patented Oct. 23, 1928.

1,688,446

UNITED STATES PATENT OFFICE.

WILLIAM J. WRIGHTON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed June 9, 1924. Serial No. 718,728.

The present invention relates to an improved goggle, and has particular reference to a face protector for such goggle.

An important object of this invention is to provide a goggle having protection means thereon that may be easily constructed in such a manner that the protection means will be securely fastened to the eye cups of the said goggles so as to prevent accidental displacement.

Another important object of the invention is to provide a goggle wherein the eye cup is provided with a plurality of apertures near the edge thereof so that a protective member may be slipped over the edge of the eye cup and united through the said apertures so as to firmly lock the said protective member to the eye cup.

Other objects and advantages of this invention will become apparent during the course of the following description.

In the drawings, wherein like numerals are employed to designate like parts throughout the same:

Figure 1:
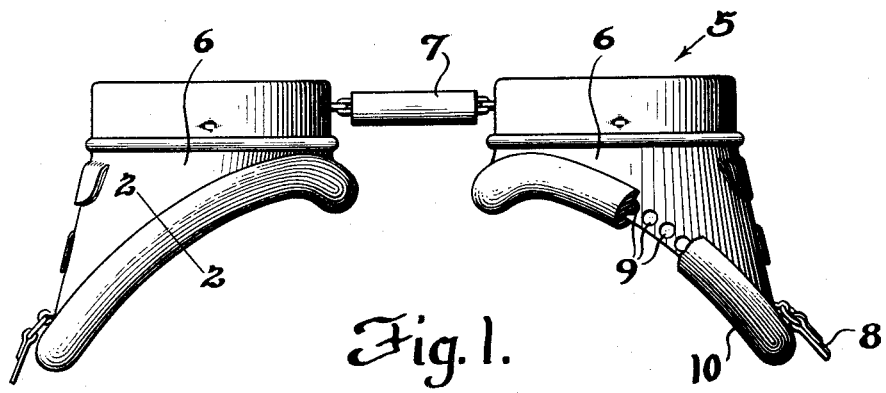
Figure 1 is a top plan view partially in section of my improved goggle construction.

In the drawings, wherein for the purposes of illustration is shown the preferred embodiment of the invention, the numeral 5 designates a goggle in its entirety, which comprises the eye cup 6 connected by means of a bridge or the like 7. The goggle 5 is retained upon the user's head by means of the head strap 8.

The eye cups 6 have formed therein around the edge thereof the relatively large apertures 9. The apertures 9 are arranged rather closely together as can be seen in Figure 1.

Figure 2:
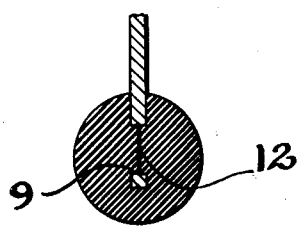
Figure 2 is a section taken on line 2—2 in Figure 1.
Figure 3:
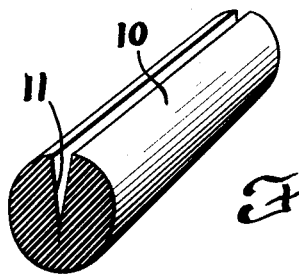
Figure 3 is a fragmentary perspective view of the protective member before it has been applied to the goggle.

In Figure 3 is shown a length of preferably rubber material 10, which is split as at 11. The rubber material 10 is adapted to be slipped onto the edge of the eye cup 6 in such a manner that the edge of the said cup will be received within the split portion 11 so as to entirely conceal the apertures 9. After the protective member 10 has been placed in position, as shown in Figures 1 and 2, it is pressed or clamped in such a manner that a portion of the material will be forced in the apertures as is clearly shown in Figure 2, so that the two portions 12 will contact. I then preferably vulcanize these contacting surfaces by applying heat. It will be seen that after the contacting surfaces 12 have been vulcanized it will be almost impossible for the rubber protective member 10 to become displaced in the eye cup 6.

The protective member 10 may be cemented instead of vulcanized as above described, but I have found that by vulcanizing the portions 12 an exceptionally strong connection is made. Obviously the protective member 10 is not necessarily restricted to rubber, except in cases where it is desired to vulcanize the same through the apertures 9.

It is understood that the form of the invention herewith shown and described is to be taken as the preferred embodiment of the same and that various changes in the size, shape and arrangement of parts may be resorted to without departing from the spirit of the invention or the scope of the subjoined claim.

Having thus described my invention, I claim:

In a device of the character described, an eye cup having a series of transverse openings near its edge and spaced therefrom, a solid non-tubular soft binding having a slit portion from the edge inwardly past the center thereof pressed over the edge of the eye cup so that the opposite sides of the slitted portion of the binding contact through the openings in the eye cup, and an adhesive securing the contacting surfaces of the binding together.

WILLIAM J. WRIGHTON.